Patented Dec. 24, 1929

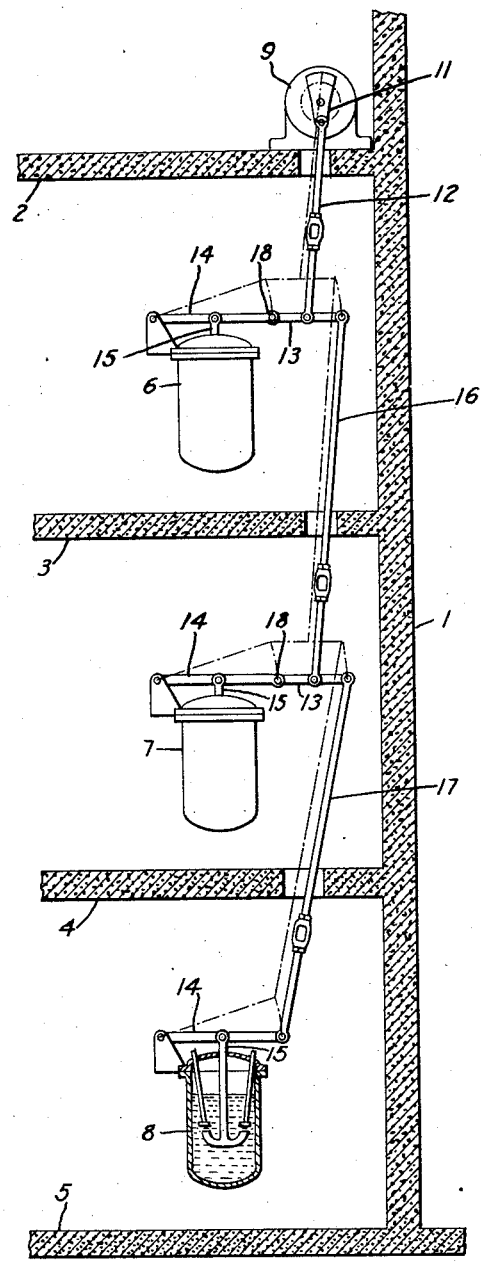

1,740,531

UNITED STATES PATENT OFFICE

CHRISTIAN AALBORG, OF PITTSBURGH, PENNSYLVANIA, ASSIGNOR TO WESTINGHOUSE ELECTRIC & MANUFACTURING COMPANY, A CORPORATION OF PENNSYLVANIA

CIRCUIT-BREAKER SYSTEM

Application filed January 8, 1923. Serial No. 611,261.

My invention relates to circuit breaker systems, and it has particular relation to such systems as embody mechanism for operating a plurality of circuit breakers simultaneously.

One object of my invention is to provide a simple and efficient mechanism whereby a plurality of circuit breakers may be operated simultaneously.

A second object of my invention is to provide operating mechanism for a plurality of circuit breakers which, in case of abnormal operating conditions in one or more of the circuit breakers, will permit the operation of the remaining circuit breakers.

In the operation of a single mechanism for effecting the opening and closing of a plurality of circuit breakers, it may occur that one or more of the circuit breakers may offer abnormal resistance to the operating mechanism by reason of "freezing" of contact members or other abnormal conditions. In the absence of provision of means for compensating for this condition, the mechanism may fail to operate any of the circuit breakers that are mechanically associated.

In accordance with the present invention, I provide a mechanism in which the force of the power device is effective to open or to close all of the remaining circuit interrupters in case abnormal resistance is offered by any of the several circuit breakers of the system. When some of the circuit breakers have been operated, the force of the power device is then directed toward the one or ones in which abnormal conditions obtain, and their operation is then ordinarily effected.

In the accompanying drawing, the single figure is a diagrammatic view of structure and apparatus embodying my invention.

A power house, only a portion of which is shown, has a wall 1 and floors 2, 3, 4 and 5. Between each pair of floors is located a circuit breaker of any conventional type. The circuit breakers 6, 7 and 8, three being shown by way of example, may be supported by any suitable means (not shown).

The circuit breakers, which are in substantially vertical alinement, are arranged for simultaneous operation by a mechanism that comprises a power device 9, which may be, for example, an electric motor, a crank arm 11 that is secured to the motor shaft, a link 12, connected to the crank arm 11, a floating link 13 and a lever 14 that is connected to the circuit breaker mechanism, which is represented by a plunger 15. A link 16 connects the outer end of floating link 13 to a similar link 13 that is connected to the operating mechanism of circuit breaker 7 by mechanism identical with that described in connection with circuit breaker 6. A link 17 connects the floating link 13 of circuit breaker 7 with a lever 14 of circuit breaker 8, the floating link 13 being omitted as it is unnecessary in connection with the last circuit breaker in the series.

It may be assumed that the motor 9, the circuit breakers 6, 7 and 8, and their associated mechanisms, are in the respective positions in which they are illustrated. In circuit breakers of the conventional type, these positions of the mechanisms correspond to the open positions of the circuit breakers. It may be assumed further that it is desired to close the circuit breakers.

The circuit of the motor 9 is closed by any suitable means (not shown) to cause the crank arm 11 to rotate substantially 180°. In case the operation of the circuit breakers is not affected by abnormal conditions existing in the operating mechanism of any of them, the force of the motor 9 is transmitted by the links 12, 16 and 17 to the levers 14, and the latter operate to lift the plungers 15.

During the operation, the floating links 13 maintain a nearly horizontal position by reason of the fact that the forces exerted upon their respective ends are substantially in equilibrium. Whenever any tendency exists for a turning movement of the links 13, a counterbalancing longitudinal force is exerted from the fixed point of the levers 14. When the crank 11 has completed substantially a half revolution, the several members of the link-and-lever mechanism occupy the respective positions designated by dot-and-dash lines.

It may be assumed, however, that, for some reason, the force required to close circuit breaker 6 materially exceeds that normally required. In such case, the application of the force of the motor to the link 13 connected to circuit breaker causes the link 13 to rotate in a counter-clockwise direction about its point of pivotal connection 18 to operate the mechanism connected with circuit breakers 7 and 8 in the usual manner. When the circuit breakers 7 and 8 are in their closed positions, the motor, crank arm 11, link 12 and operating mechanism for circuit breaker 6 have not reached a corresponding position. The force of the motor will be directed toward the operation of circuit breaker 6 and, at a point in its rotation in which the leverage exerted by the crank arm 11 is greatest. The result is to effect the operation of circuit breaker 6 under all ordinary conditions.

In case either of the circuit breakers 7 and 8 fail to operate upon the initial rotation of the motor 9, the remaining circuit breaker will be operated by reason of the pivotal connection of the floating links 13 to the corresponding levers 14. It will be appreciated that the completion of the movement of the motor 9 requires that each of the floating links 13 be actuated to their respective dot-and-dash line positions, and that the failure of any circuit breaker to operate permits the application of the force of the motor to that circuit breaker after the other circuit breakers have reached an operating position.

In case it is desired to open the circuit breakers, the motor is operated in the same direction or it may be reversed, if desired, to actuate the crank arm 9 from its upper position to its lower position, in which it is illustrated. In case any one of the circuit breakers tends to remain in its closed position and more than the usual force is required to open it, the operation is similar to that described in connection with the closing operation, in that the link 13 connected to that circuit breaker, rotates in a clockwise direction about its pivotal connection 18 to effect the opening of the remaining circuit breakers. The force of the motor is usually effective to open the remaining circuit breaker at this stage of the operation.

It will be appreciated that I have provided a simple and efficient means whereby a plurality of vertically alined circuit breakers may be opened or closed by a common actuating means. I have provided means for compensating for the failure of one or more circuit breakers to operate whereby the remaining circuit breakers may be actuated to their open or closed positions, as the case may be. The opening of two circuit breakers of a three-phase system will open the circuit and the temporary failure of the remaining circuit breaker to operate does not delay the opening of the circuit. The above and other advantages will be apparent to those skilled in the art to which my invention appertains.

I claim as my invention:

1. In an electrical apparatus, a plurality of circuit interrupters, each of said circuit interrupters comprising a movable contact member, means for simultaneously operating said circuit interrupters, said operating means comprising a system of differentially associated levers for effecting the operation of the circuit interrupters in sequence when abnormal conditions are present.

2. In a circuit interrupter system, a plurality of circuit interrupters, each comprising a movable contact member, a mechanism connecting the several movable contact members, said mechanism comprising a system of differentially associated levers for apportioning the closing energy to the different circuit interrupters when abnormal conditions are present.

3. In a circuit interrupter system, a plurality of circuit interrupters at different levels, a movable contact member in each circuit interrupter, and means for simultaneously moving said movable contact members, said means comprising a floating link for each circuit interrupter whereby unusual differences in the length of travel of the several movable contact members is permitted.

4. In combination, a plurality of circuit interrupters, each comprising a movable member, and means for actuating said movable members simultaneously, said means comprising a lever connected to each movable member, means for connecting said levers comprising a floating link, and an actuating member connected to said floating link at an intermediate portion whereby said movable members may, under predetermined conditions be actuated in sequence.

5. In a circuit interrupter system, a plurality of circuit interrupters at different levels, an actuating device, a lever system operable thereby under normal conditions to simultaneously actuate said circuit interrupters to closed circuit position, said lever system comprising a plurality of differentially associated links that are adapted to permit the operation of the remaining circuit interrupters independently of incomplete operation of one or more of said circuit interrupters.

6. In combination with the operating levers of a plurality of circuit interrupters, an actuating mechanism therefor, a tie-rod for each of the circuit interrupters, a plurality of links each having the mid-point connected to a tie-rod, the end portions being joined to a second tie-rod and to an operating lever, respectively, the one end of the first tie-rod being joined to the actuating mechanism and the last tie-rod being directly connected to the most remote operating lever.

7. In combination, a plurality of circuit interrupters each of which has a movable member, a common power device for actuating said members simultaneously and compensating means whereby, when unusual force is required to actuate one of said members, the other members may be actuated to the selected position prior to the actuation of said one member, said compensating means comprising a floating link that is operatively connected to a plurality of said movable members.

8. In combination, a plurality of circuit interrupters each of which has a movable member, a common power device for actuating said members simultaneously and compensating means whereby, when unusual force is required to actuate one of said members, the other members may be actuated to the selected position prior to the actuation of said one member, said compensating means comprising a plurality of floating links.

9. An arrangement of circuit interrupters in which a plurality thereof are in alignment, operating means on each circuit interrupter adapted to actuate the contacts thereof, an actuating mechanism therefor, a plurality of links adapted to transmit force from the actuating mechanism to the said operating means and a plurality of additional links each indirectly connecting one of the first said links to an adjacent operating means and employed on all but the operating means most remote from the actuating means.

In testimony whereof, I have hereunto subscribed my name this 18th day of December, 1922.

CHRISTIAN AALBORG.